United States Patent Office 3,705,896
Patented Dec. 12, 1972

3,705,896
PYRAZOLO[3,2-c]-s-TRIAZOLES AND PROCESS
FOR THE MANUFACTURE THEREOF
Joseph Bailey, Bushey Heath, England, assignor to
Eastman Kodak Company, Rochester, N.Y.
No Drawing. Filed Jan. 15, 1971, Ser. No. 106,891
Claims priority, application Great Britain, Jan. 15, 1970,
1,957/70
Int. Cl. C09b 23/00; C07d 55/06
U.S. Cl. 260—240 E      11 Claims

ABSTRACT OF THE DISCLOSURE

A process for producing 1H-pyrazolo[3,2-c]-s-triazoles by fusing the reaction product of a thiocarbohydrazide and an alkylhalide with a keto-ester. The product has utility as a photographic coupler compound for producing magenta dyes and also as an intermediate for synthesizing various azamethine dyes, azo dyes, and cyanine-sensitizing dyes found useful in the photographic art.

---

This invention relates to an improved process for the synthesis of 1H-pyrazolo[3,2-c]-s-triazoles.

British patent specification No. 918,128 describes pyrazolino-benzimidazole color photographic couplers which form magenta dyes on coupling or reacting with oxidized color developers. However, couplers of this general type sometimes produce inadequate color images when incorporated into silver halide emulsions in the form of a dispersion.

Magenta dyes formed from 5-pyrazolone couplers, for example, frequently exhibit unwanted absorption in the blue-light range and do not demonstrate a satisfactorily sharp spectral absorption curve on the long wavelength side.

As a result, there has been a long continuing search for new magenta dye-forming photographic couplers which will produce dyes having better spectral absorption characteristics combined with good coupling activity, plus new and better ways of producing them.

It is an object of the present invention to find a new and more direct reaction process for producing various 1H-pyrazolo[3,2-c]-triazoles from the corresponding S-alkyl-isothiocarbohydrazide hydrohalides with keto esters.

The above object is accomplished in accordance with the instant invention whereby a class of dye-forming photographic couplers is obtained by reacting an isothiocarbohydrazide hydrohalide with a keto ester, the isothiocarbohydrazide reactant being conveniently obtained, for instance, from the corresponding thiocarbohydrazide with an alkyl or a substituted alkyl halide such as the iodide. The preparation of isocarbohydrazide is more readily controlled if effected in an inert organic solvent such as a lower aliphatic alcohol, exemplified by amyl alcohol.

An aspect of the present invention is conveniently demonstrated by the following equation:

(I)   $R^8$                    (II)
$2H_2NNHC=NNH_2 \cdot HX + R^1COCH_2COOR^7 \longrightarrow$
(III)

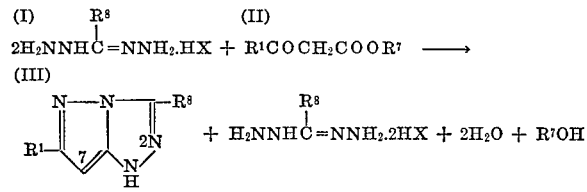

$+ H_2NNHC=NNH_2 \cdot 2HX + 2H_2O + R^7OH$ wherein $R^1$ is defined as an alkyl, alkylthio, aryl, or heterocyclic radical containing 5–6 members in the nucleus; such definitions include, for instance, a straight or branched chain alkyl moiety of 1–22 carbon chain, and particularly a tertiary alkyl of 1–8 carbon atoms, exemplified by (t)-butyl and 2,2-dimethyl propyl. The alkyl thio radicals include methyl-, octyl- and octadecylthio moieties; aryl group includes phenyl, α- or β-naphthyl radicals; and the heterocyclic radical typically includes radicals having an oxygen, nitrogen, or sulfur atom in the cyclic nucleus as exemplified by furyl, pyridyl, and thienyl radicals. $R^1$, as defined, also includes the above-listed radicals such as alkyl, aryl, alkylthio, etc., which contain substituent groups attached thereto such as hydroxyl, amino, nitro, halo, and aryl groups, inclusive of chloro, phenyl, naphthyl, and benzyl groups; X is an acid anion exemplified by halide ions such as $Cl^-$, $Br^-$, $I^-$, particularly the iodide ion. $R^7$ is an alkyl group including 1–22 carbon containing alkyls and particularly lower alkyls such as methyl, ethyl, isopropyl and octyl; and wherein $R^8$ is defined as —SR, in which R is an alkyl including substituted alkyl groups, as exemplified by methyl, ethyl, octyl, dodecyl, eicosyl, halo alkyl, particularly lower alkyls.

Compounds of interest for purposes of the present invention include those in which the $R^8$ radical is defined as an —SR group and R is defined as a lower alkyl and particularly where $R^1$ is a branched lower alkyl radical.

The above described reaction is conveniently effected by using a reactive amount, i.e., a ratio of carbohydrazide-to-keto ester of about 1–1.5:1 at an elevated temperature, preferably at reflux temperatures of from about 75°–130° C. The cyclization reaction as described above and hereinafter exemplified may be effected without a reaction solvent, however, amyl alcohol can be used for this purpose, if desired.

Substituents required at the #7 coupling position of Compound III can be included within the scope of the present invention. By way of example, a halo substituent radical such as a bromine or chlorine atom may be introduced onto the 7-position of a compound of Formula III to obtain a compound of the formulae:

(IV)

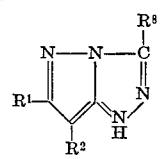

or (V)

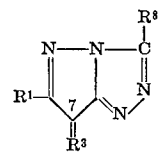

wherein $R^2$ and $R^3$ constitute the additional substituent groups. By way of example, halo radicals may be introduced by treatment with a halogenating agent such as bromine or sulfurylchloride in the manner of Examples 8–9.

The above-indicated halo radicals and many other substituent groups may also be introduced into #7 position of Formula III in the manner described in copending U.S. patent applications Ser. Nos. 106,892 and 106,893 which are continuations-in-part of abandoned Ser. Nos. 778,329 and 778,333 entitled "Color Forming Couplers" and "Dyes for Photography," filed Nov. 22, 1968, and in Belgian Pat. No. 724,427, which are incorporated by reference. In accordance with the supplemental steps disclosed, $R^2$ may be here defined to include halo, such as chloro or bromo; cyano; carboxyl; sulfonic acid group; an acyloxy, such as the corresponding radicals of formic, isovaleric and arachidic acids; aryloxy, such as a phenoxy, or naphthoxy; an arylthio such as phenylthio; an amino radical including substituted amines exemplified by N-methyl amino, N-octyl amino, N,N-di-methyl and N-octadecyl amino; also —N=N—$R^{10}$ wherein $R^{10}$ is the residue of an aromatic or heterocyclic diazotizable amine precursor. $R^2$ is also usefully defined to include a chromophoric-free development-inhibiting organic radical such as described and prepared, for instance, in British patent specification No. 953,454 and U.S. Pat. 3,227,554 and herein incorporated by reference.

If, for example, it is desired to make a compound of Formula IV in which $R^2$ is defined as

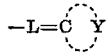

or

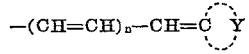

wherein

represents a heterocyclic nuclei such as a pyrazolotriazole residue, L is a methine or straight chain conjugated hydrocarbon linking group, and $n$ is 0–3, two moles of the appropriate compound of Formula III are reacted with one mole of a compound used in the preparation of symmetrical cyanine dyes. Examples of such compound include ethyl ortho-formate ($n=0$) and 1,1,3-trimethoxy-3-ethoxypropane ($n=1$). Generally speaking, if it is desired to obtain a compound of Formula IV or V in which $R^2$ and $R^3$ are respectively

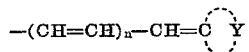

or

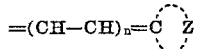

and wherein

and

are heterocyclic nuclei of the kind present in cyanine and related dyes as further described in our above-cited copending application entitled "Dyes for Photography" and Belgian Pat. 724,427, and $n$ is 0–3, then an appropriate compound of Formula IV, in which $R^2$ is hydrogen, can be reacted with a compound having the desired nucleus and substituted with a group which will provide, on reaction, the required linkage. If this linkage is a direct one, an alkoxy or alkylthio group will serve. If a single methine group linkage is required, an aldehyde or alkoxymethylene group is used. If a two-carbon methine chain is required, an acylanilidovinyl group is utilized; if a three-carbon chain is required an alkoxyallylidene group is used; and if a four-carbon chain is required, an acylanilidobutadienyl group may be utilized.

Also included within the scope of the present invention is the combined reaction mechanism described above whereby it is possible to obtain product compounds of Formula IV wherein the $R^2$ radical is joined at the #7 coupling position of the coupler molecule by a thio linkage (—S) which is broken during development to yield a diffusible mercapto compound functioning as the development-inhibiting substance. The coupler product is known as a "DIR" coupler. In such case $R^2$ may be conveniently defined as a —S-phenyl or —S-naphthyl group, or as

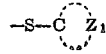

in which

is defined as a heterocyclic radical containing at least one hetero nitrogen, oxygen or sulfur atom, and preferably 1–4 nitrogen atoms.

The coupler compound may contain, for instance, a mercaptotetrazole, a thioglycolic acid derivative, a mercaptothiazole, a thiosalicyclic acid, a mercaptoalkylamidobenzothiaozle, a mercaptoalkylamido thiazole, a mercaptoazine, a mercaptoazole, a mercaptocysteine, a mercaptoglutathione, a mercaptooxadiazole, a mercaptopyrimidine, a mercaptothiadiazole, a mercaptothiophene, a mercaptotriazine and a mercaptotriazole group in coupling position. The above groups may also include the substituted groups having, as substituents, nitro, halo (chloro, bromo, etc.), lower alkyl (methyl, octyl), lower alkylamido (methyl and butylamide), lower alkoxy of 1–8 carbon atoms, lower alkylsulfonamido, α-chloroacetylthio, amino, and lower alkyl carbamyl.

Corresponding suitable development-inhibiting moieties of the above coupler compounds, which are liberated during development of the photographic emulsions with primary aromatic amino silver halide developing agents, include, for instance, triazolyl, tetrazolyl, thiazolyl and mercaptotetrazolyl radicals. Displaceable groups as above listed may also be conveniently linked to the coupler residue in the coupling position by azo linkages; o-amino and o-amido monocyclic aryl (i.e., phenyl or naphthyl) azo radicals, azoxy and triazolyloxy radicals.

$R^2$ is further conveniently defined as a substituent radical of the formula

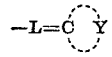

wherein L is a methine or straight chain conjugated hydrocarbon linking group, particularly —(CH=CH)$_n$—CH= in which $n$ is 0–3; and

represents a heterocyclic moiety, particularly of the kind present in cyanine or cyanine-type related dyes to complete the chromophoric system. Such heterocyclic radicals include, for instance, a residue of the Formula V supra in which L, as above defined, replaces the $R^3$ radical.

Included within the definition of $R^2$ are heterocyclic groups inclusive of a pyrazolo-s-triazolylidene, a thiothiazolidone, a 4,6-dioxo-hexahydrothiopyrimidylidene, a 2-pyrrole, a 3-pyrrole, a 2-indole, a 3-indole, a 1-indolizine, a 3-indolizine, a rhodanine, or a barbituric acid group.

The $R^3$ radical of Formula V is conveniently defined as $R^2$ plus a proton, where Formulae IV and V represent tautomers; as a cyclic radical or group completing the chromophoric system of a cyanine or cyanine-type dye; as an aryl radical such as a benzylidene radical, including nitrobenzylidene; $R^3$ is also conveniently defined as a radical of the formula

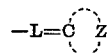

or

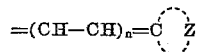

in which L and $n$ are defined as above for $R^2$, and

represents a heterocyclic radical. Heterocyclic radicals of the present invention in defining $R^3$ include triazole, indolenine, benzthiazole, pyrrole, benzoxazole, benzoselenazole, benzimidazole, quinoline, and isoquinoline radical groups.

The above compounds of Formulae IV and V, in which $R^2$ and $R^3$ are groups completing a chromophoric system, are dyes which are generally suitable for use as sensitizing dyes for photographic silver halide emulsions or filter dyes.

The compounds of Formula IV, in which $R^2$ is a group which splits off on treating the compound with an oxidized colour developing agent may be employed as dye-forming couplers in colour photographic processes. Thus, depending upon the other substituents present in the molecule, the defined compound can be incorporated in a colour developing solution for a silver halide emulsion layer, or in a silver halide emulsion layer which is to be developed in a colour developing solution which contains no dye-forming coupler. In either case the colour developing agent can be one of the well-known primary aromatic amine developing agents such as:

N,N-diethyl-p-phenylenediamine monohydrochloride,
N-methyl-p-phenylenediamine hydrochloride,
N,N-dimethyl-p-phenylenediamine hydrochloride,
2-amino-5-diethylaminotoluene monohydrochloride,
2-amino-5-(N-ethyl-N-lauryl)toluene,
N-ethyl-N-β-methanesulphonamidoethyl-3-methyl-4-amino-aniline sesquisulphate monohydrate,
N-ethyl-N-β-methanesulphonamidoethyl-4-amino-aniline,
4-N-ethyl-N-β-hydroxyethylaminoaniline,
4-amino-3-methyl-N-ethyl-N-β-hydroxyethyl aniline sulphate; and
4-amino-N,N-diethyl-3-β-methanesulphonamidoethyl aniline hydrochloride.

The dye obtained upon reaction of coupler in solution with the oxidized color developing agent will be an azamethine dye and can be used as a filter dye.

The following examples illustrate the invention:

EXAMPLE 1

3-methylthio-6-phenyl-1H-pyrazolo[3,2-c]-s-triazole (Compound 1)

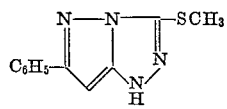

Ethyl benzoylacetate (9.6 grams) and S-methyl isothiocarbohydrazide hydriodide (12.4 grams) were heated together at 110°–115° C. for 25 minutes. During the last 5 minutes of the heating the volatile reactants were distilled off in vacuo. The reaction mixture was cooled and then heated with sufficient boiling 10% sodium carbonate solution (about 300 ml.) to effect solution of most of the reaction mass. A small amount of oily residue remained which was removed by filtration. On cooling the hot clear carbonate solution the product crystallized and was collected by filtration. It was recrystallized from benzene as tiny buff-coloured needles. The yield of product which melted at 179° C. was 5 grams. It coupled with oxidized 2-amino-5-diethylaminotoluene developer to give a dye which had $\lambda_{max.}$ ethyl acetate at 565 nm. The S-methyl isothiocarbohydrazide hydriodide was prepared by adding methyl iodide (18 grams) to a well stirred suspension of thiocarbohydrazide (12 grams) in boiling ethanol (400 ml.) and heating under reflux for 2 hours. The product was isolated by cooling the hot filtered solution and collection of the separated product by filtration. Concentration of the ethanol solution to about half volume gave a second crop. The yield of colourless crystals was 70%. The product melted at 145° (with decomposition).

EXAMPLE 2

3-methylthio-6-m′-nitrophenyl-1H-pyrazolo[3,2-c]-s-triazole (Compound 2)

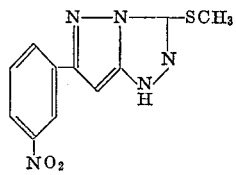

Ethyl m-nitrobenzoyl acetate (2.4 grams and S-methyl isothiocarbohydrazide hydriodide (2.5 grams) were heated at 120° C. for 15 minutes. The reaction mass was treated with carbonate solution as described in the previous example. The dark yellow solid product, which separated was collected, melted at 21°–217° C. and coupled with oxidized 2-amino-5-diethylaminotoluene developer to give a dye having $\lambda_{max.}$ ethyl acetate at 585 nm.

EXAMPLE 3

6-heptadecyl-3-methylthio-1H-pyrazolo[3,2-c]-s-triazole (Compound 3)

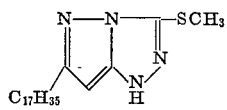

A solution of ethyl stearoylacetate (2.1 grams) and S-methyl isothiocarbohydrazide hydriodide (1.6 grams) in n-amyl alcohol (25 ml.) was heated under reflux for 2 hours. On cooling some solid material separated and was collected by filtration. Ether was added to the amyl alcohol solution to precipitate more solid material which was also filtered off. Neither solid coupled with oxidized developers. The solution was concentrated to leave an oil which was treated with benzene (100 ml.) and the solvent again removed. The residual gum (2 grams) coupled with oxidized 2-amino-5-diethylamino toluene developer to give a dye having $\lambda_{max.}$ ethyl acetate at 541 nm.

EXAMPLE 4

3-methylthio-6-p-nitrophenyl-1H-pyrazolo[3,2-c]-s-triazole (Compound 4)

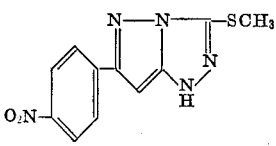

Ethyl p-nitrobenzoylacetate (2.26 grams) and S-methyl-isothiocarbohydrazide hydriodide (2.36 grams) were heated in boiling amyl alcohol (40 cc.) for 35 minutes. The reaction mixture was cooled and the product which precipitated as yellow crystals was collected by filtration and recrystallised from amyl alcohol. The purified product was collected, washed with ethanol and dried. The yield of product which melted at 277° C. was 1 gram. It coupled with oxidized 2-amino-5-diethylaminotoluene developer to give a dye with $\lambda_{max.}$ ethyl acetate at 588 nm.

EXAMPLE 5

3-methylthio-6-propyl-1H-pyrazolo[3,2-c]-s-triazole (Compound 5)

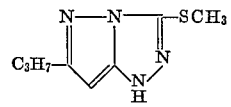

This compound was prepared similarly to Example 3 using a proportionate amount of ethyl butyrylacetate instead of ethyl stearoylacetate. The product which was obtained as a gum coupled with oxidized 2-amino-5-diethylaminotoluene developer to give a dye with $\lambda_{max.}$ ethyl acetate at 541 nm.

EXAMPLE 6

6,2'-furyl-3-methylthio-1H-pyrazolo[3,2-c]-s-triazole (Compound 6)

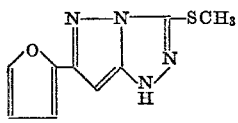

This compound was prepared as in Example 3 using ethyl-2-furoylacetate instead of ethyl stearoylacetate. The product which was obtained as a gum coupled with oxidized 2-amino-5-diethylaminotoluene developer to give a dye having $\lambda_{max.}$ ethyl acetate at 567 nm.

EXAMPLE 7

3,6-di(methylthio)-1H-pyrazolo[3,2-c]-s-triazole (Compound 7)

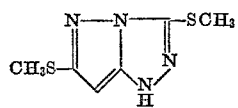

O-ethyl-S-methyl asymmetric diethiomalonate (1.78 grams) (Laakso, Suomen Kemistilehte, 1944, 17B, 1–6) and S-methyl isothiocarbohydrazide hydriodide (2.36 grams) were heated in boiling amyl alcohol (25 ml.) for 30 minutes and worked up as in Example 3. The product which was obtained as a gum coupled with oxidized 2-amino-5-diethylamino toluene developer to give a dye having $\lambda_{max.}$ ethyl acetate at 533 nm.

EXAMPLE 8

7-bromo-3-methylthio-6-phenyl-1H-pyrazolo-[3,2-c]-s-triazole (Compound 8)

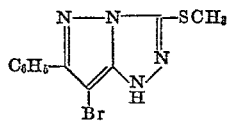

Compound 1 (1 gram), sodium acetate (0.42 gram) were dissolved in acetic acid (30 ml.) and the solution was treated with bromine (0.8 gram) in acetic acid (4 ml.) portionwise. The mixture was allowed to stand at room temperature for 40 minutes and then heated on a steam bath for 20 minutes, after which it was cooled back to room temperature and poured into water (150 ml.). The precipitated product was collected by filtration, washed with water and dried. It weighed 1.1 grams, melted at 152°–153° and coupled with oxidised 2-amino-5-diethylamino toluene developer to give a magenta dye.

EXAMPLE 9

7-chloro-3-methylthio-6-phenyl-1H-pyrazolo-[3,2-c]-s-triazole (Compound 9)

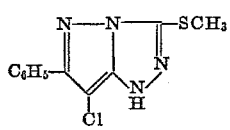

Compound 1 (1 gram) was dissolved in acetic acid (15 ml.) and sulphuryl chloride (0.65 gram) were slowly added to the solution, the mixture was heated on the steam bath for 5 minutes and allowed to stand at room temperature for 1 hour. The mixture was then poured into water (200 ml.) and the precipitated product was collected by filtration and dried. It weighed 0.9 gram and melted at 150°

EXAMPLE 10

7 - (3 - methylthio - 6 - phenyl - 7H - pyrazolo[3,2-c]-s - triazol - 7 - ylidene) - methylene - 3 - methylthio-6-phenyl-1H-pyrazolo[3,2-c]-s-triazole (Compound 10)

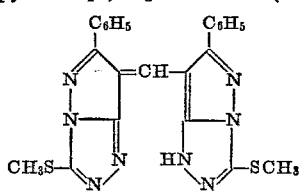

Compound 1 (0.1 gram), ethylorthoformate (1 ml.) and acetic acid (4 ml.) were heated at boiling point for 5 minutes. The product which crystallized from the hot reaction mixture was isolated after cooling by filtration. It was washed with ethanol, dried and obtained in almost theoretical amount. It has an absorption maximum in methanol in the presence of triethylamine at 494 nm.

EXAMPLE 11

7,3' - (3 - methylthio - 6 - phenyl - 7H - pyrazolo[3,2-c]-s - triazol - 7 - ylidene)allylidene - 3 - methylthio - 6-phenyl-1H-pyrazolo[3,2-c]-s-triazole (Compound 11)

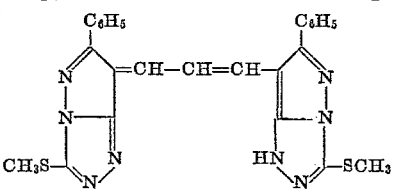

A solution of Compound 1 (0.23 gram) and 1,1,3-trimethoxy-3-ethoxypropane (0.2 ml.) in acetic acid (5 ml.) was heated under reflux for 2 minutes. The solid dye product separated from solution and after cooling it was collected and recrystallized in almost quantitative yield from methanol. The product was obtained as dark green metallic crystals $\lambda_{max.}$ methanol at 554 nm.

EXAMPLE 12

3-ethyl-2-(3-methylthio-6-phenyl-7H-pyrazolo[3,2-c]-s-triazole-7-ylidene)benzthiazoline (Compound 12)

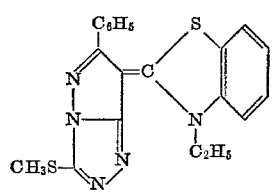

Compound 1 (0.23 gram), 2-ethylthiobenzthiazole ethiodide (0.34 gram), triethylamine (0.5 ml.) and ethanol (5 ml.) were heated under reflux for 10 mins. After chilling the reaction mixture, the separated dye was collected and recrystallised from ethanol as pale yellow crystals. It weighed 0.1 gram and had $\lambda_{max.}$ methanol at 410 nm.

EXAMPLE 13

3-methylthio-7-p-nitrobenzylidene-6-phenyl-7H-pyrazolo[3,2-c]-s-triazole (Compound 13)

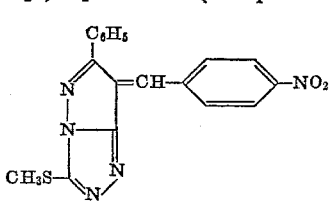

Compound 1 (0.23 gram), p-nitrobenzaldehyde and acetic acid (5 ml.) were heated under reflux for 10 mins. After cooling the product was precipitated by dilution with water (25 ml.) and collected by filtration.

It was twice recrystallised from ethanol and obtained in 20% as pale yellow crystals. It coupled with oxidized 2-amino-5-diethylamino toluene developer to give a dye $\lambda_{max}$. ethyl acetate at 565 nm.

EXAMPLE 14

7-(1-ethyl-2,5 - dimethyl-3 - pyrryl)methylene-3-methylene-3-methylthio-6-phenyl - 7H-pyrazolo[3,2-c]-s-triazole (Compound 14)

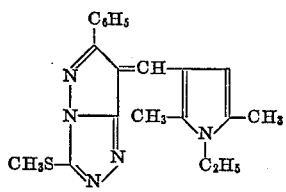

Compound 1 (0.46 gram), 1-ethyl-2,5-dimethylpyrrol-3-aldehyde (0.3 gram) were dissolved in boiling ethanol (10 ml.) and triethylamine (1 ml.) was added and the solution was reflux for 10 minutes. The solution was concentrated to 5 ml. and well chilled when the dye product (0.25 gram) separated. It was twice recrystallised from methanol givin 0.15 gram orange needles. The dye has $\lambda_{max}$. methanol at 447 nm.

EXAMPLE 15

5-(3-methylthio - 6 - phenyl - 1H-pyrazolo[3,2-c]-s-triazol-7-yl)methylene - 3 - phenyl-2-thiothiazolid-4-one (Compound 15)

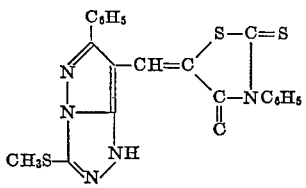

A mixture of Compound 1 (0.23 gram), 5-ethoxymethylene-3-phenylrhodanine (0.26 gram), triethylene (0.42 ml.) and ethanol (20 ml.) was heated under reflux for 10 minutes. About half the ethanol was removed by distillation, water (10 ml.) added, and the mixture made slightly acid with hydrochloric acid. The dye precipitated as a gum which rapidly hardened. After collection by filtration the product was recrystallised from a mixture of benzene and petroleum ether. The dye which was obtained in 55% yield had $\lambda_{max}$. methanol at 495 nm.

EXAMPLE 16

3-ethyl-2,2' - (3 - methylthio-6-phenyl-1H-pyrazolo[3,2-c]-s - triazole - 7 - ylidene)ethylidenebenzoxazoline (Compound 16)

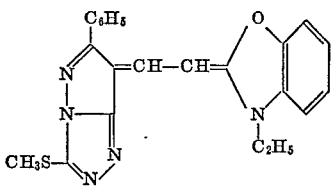

A mixture of Compound 1 (0.23 gram) 2,2'-acetanilidovinylbenzoxazole ethiodide (0.45 gram), triethylamine (0.42 ml.) and ethanol (20 ml.) was heated under reflux for 10 minutes. Water (20 ml.) was added to the cooled reaction solution and the product which was obtained in almost quantitative yield was recrystallised from methanol as yellow crystals having $\lambda_{max}$. methanol at 480 nm.

EXAMPLE 17

3-ethyl-2,2' - (3-methylthio-6-phenyl - 7H-pyrazolo[3,2-c]-s-triazol-7-ylidene)ethylidenebenzthiazoline (Compound 17)

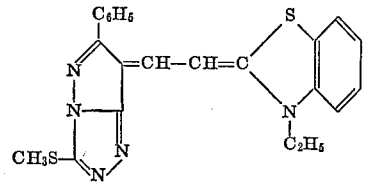

Compound 1 (0.46 gram) 2,2'-acetanilidovinylbenzthiazole ethiodide (0.9 gram), triethylamine (1 ml.) and ethanol (30 ml.) were heated together on a steam bath for 10 minutes. The reaction mixture was cooled and the separated product was collected by filtration. It was recrystallised twice from methanol. The purified product weighed 0.2 gram and has $\lambda_{max}$. methanol at 521 nm.

EXAMPLE 18

7,3'-(1,3 - diethyl - 4,6-dioxo-hexahydro-2-thiopyrimid-5-ylidene)allylidene - 3 - methylthio-6-phenyl-1H-pyrazolo[3,2-c]-s-triazole (Compound 18)

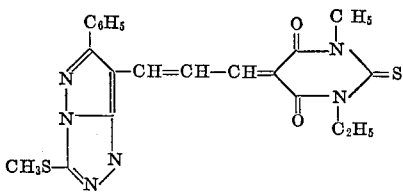

Compound 1 (0.46 gram) and 1,3-diethyl-4,6-dioxo-5-(3-ethoxyallylidene)hexahydro - 2-thiopyrimidine (0.56 gram) were dissolved in boiling ethanol (20 ml.) and the mixture was refluxed for 10 minutes. The reaction mixture was cooled and the dye was collected by filtration. The product was purified by dissolving it in hot pyridine and reprecipitating by the addition of ethanol to the cooled pyridine soltion. The product which weighed 0.4 gram had $\lambda_{max}$. methanol at 535 nm.. and 561 nm.

EXAMPLE 19

3-ethyl-2,4'-(3-methylthio - 6 - phenyl-7H-pyrazolo[3,2-c]-s-triazol-7-ylidene) but - 2' - enylidenebenzthiazoline (Compound 19)

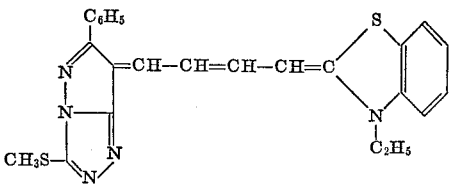

Compound 1 (0.46 gram), 2,4'-acetanilidobutadienylbenzthiazole ethiodide (0.95 gram) were dissolved in boiling ethanol (70 ml.). Triethylamine (1 ml.) was added and a deep blue dye was formed. The mixture was heated under reflux for 5 minutes and on chilling dark blue needles separated. The product (0.6 gram) was collected and recrystallised twice from methanol. The dye had $\lambda_{max}$. methanol at 619 nm.

EXAMPLE 20

A sensitizing amount of each of dye Compounds 11, 16, 15, 17, 12 and 19 indicated in the table below was added to separate portions of a negative-type, developing out gelatino silver chlorobromide emulsion. Each of these emulsions was coated onto a piece of cellulose ester film support and dried. Spectrographic exposures were made at 1/25 second on each coating and these were developed at room temperature in photographic developer having the following composition:

| | Grams |
|---|---|
| p-Methyl aminophenol sulphate | 2.0 |
| Sodium sulphite desiccated | 90.0 |
| Hydroquinone | 8.0 |
| Sodium carbonate monohydrate | 52.5 |
| Potassium bromide | 5.0 |

Water to make 1 litre.

fixed in a conventional sodium thiosulphate fixing bath, washed and dried. The following table summarizes the wavelength of light to which the maximum sensitivity is produced, and the longest wavelength light to which each emulsion is sensitized.

Wavelength of light in nm. to which:

| | (i) Dye produces max. sensitivity | (ii) Dye sensitizes emulsion at— |
|---|---|---|
| Compound No.: | | |
| 11 | 590 | 650 |
| 16 | 510 | 570 |
| 15 | 540 | 620 |
| 17 | 510 | 580 |
| 12 | 550 | 640 |
| 19 | 580 | 640 |

EXAMPLE 21

6 - heptadecyl - 3 - methylthio - 1H - pyrazolo[3,2 - c]-s-triazole (0.2 gram) was dissolved in dibutyl phthalate (0.4 ml.) at 80° C. A hot solution (80° C.) of 10% inert bone gelatin (12.8 ml.) and 5% tri-isopropylnaphthalene sulphonate (1.2 ml.) were added to the coupler solution and the mixture was homogenized using an ultrasonic probe. Water (8.8 ml.) and 7.5% solution of saponin (0.9 ml.) were added and the mixture was filtered. A gelatino bromo-iodide emulsion (6.8 grams containing 0.69 gram silver) was added to the filtrate and the mixture was coated on a cellulose acetate film base at 425 mg. gelatin/sq. ft. dry weight and the light-sensitive material so obtained was exposed and then developed for 10 minutes at 20° C. in a color developer of the following composition:

| Water | ml | 800 |
|---|---|---|
| Anhydrous sodium sulphite | grams | 2.0 |
| 2-amino-5-diethylaminotoluene hydrochloride | do | 2.0 |
| Sodium carbonate monohydrate | do | 20.0 |
| Sodium bromide | do | 1.73 |

Water to make 1,000 ml. and pH adjusted to 10.9 (22° C.).

The development was followed by acid stop-fix, ferricyanide bleach and finally fixation stages when a magenta image was formed in the exposed regions by the formation of a dye having an absorption maximum at 559 nm. Other developing agents can be used for example, 3-methyl-4-amino-N-β-methylsulphonamidoethyl - N - ethylaniline gives a dye with absorption maximum at 555 nm.

EXAMPLE 22

A colour developer solution having the formula:

| | Grams |
|---|---|
| Sodium sulphite | 2 |
| 2-amino-5-diethylamino toluene hydrochloride | 2 |
| Sodium carbonate | 20 |
| Potassium bromide | 2 |
| Compound 5 (in ethanol sufficient to dissolve coupler) | 1.5 |

Water to 1 litre.

pH adjusted to 11.5 with sodium hydroxide solution was used to colour develop a magenta image in a strip of image exposed film coated with a layer of silver halide emulsion. The silver in the strip was converted to silver halide by treating it was a ferricyanidebromide bleach and then the silver halide was removed by treating the strip with a hypo fix bath to leave a magenta dye image having an absorption maximum at 557 nm. A magenta dye image having an absorption maximum at 570 nm. was obtained when 3-methylthio-6-phenyl-1H-pyrazolo[3,2-c]-s-triazole (Compound 1) is used as the coupler and N,N-diethyl-p-phenylenediamine as the developing agent in the above formula.

EXAMPLE 23

3-ethylthio-6-phenyl-1H-pyrazolo[3,2-c]-s-triazole

Ethyl benzoylacetate (4.8 g.) and S-ethyl isothiocarbohydrazide hydroiodide (6.5 g.) were heated together at 110–115° for twenty minutes, and then for a further five minutes while the volatile reactants were distilled off in vacuo. The reaction mass was cooled and treated with boiling 10% sodium carbonate solution (150 ml.) when most of the reaction product dissolved. The solution was filtered, chilled to give the product which was collected by filtration and recrystallised from benzene. The product, M.P. 142°, was obtained in 23% yield and coupled with oxidised 2-amino-5-diethylaminotoluene developer to give a dye which had $\lambda_{max.}$ in ethyl acetate at 564 nm.

S-ethyl isothiocarbohydrazide hydiodide was prepared from thiocarbohydrazide and ethyliodide similarly to the preparation of S-methyl isothiocarbohydrazide hydriodide (see Example 1) but the heating period was extended to six hours. The yield of product, M.P. 145° was 35%.

EXAMPLE 24

6-tertiary butyl-3-ethylthio-1H-pyrazolo[3,2-c]5-triazole

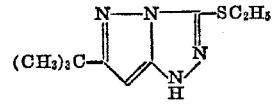

This was prepared similarly to Example 23 using a proportional amount of methyl pivaloylacetate instead of ethyl benzoylacetate. The pure product, M.P. 147° was obtained in 5% yield and coupled with oxidised 2-amino-5-diethylaminotoluene developer to give a dye which had $\lambda_{max.}$ in ethyl acetate at 542 nm.

EXAMPLE 25

3-benzylthio-6-phenyl-1H-pyrazolo[3,2-c]-S-triazole

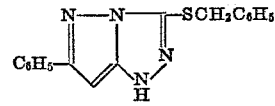

This was prepared similarly to Example 1 using S-benzylthiocarbohydrazide hydriodide (obtained in 10% yield from thiocarbohydrazide and benzyl iodide in boiling ethanol for two hours) instead of S-methyl isothiocarbohydrazide hydriodide. The product coupled with oxidized 2-amino-5-diethylaminotoluene developer to give a dye having $\lambda_{max.}$ in ethyl acetate at 562 nm.

The invention has been described in considerable detail with particular reference to certain preferred embodiments thereof, but it will be understood that variations and modifications can be effected within the spirit and scope of the invention.

I claim:
1. A process for producing a pyrazolo[3,2-c]-s-triazole comprising contacting a reactive amount of an isothiocarbohydrazide of the formula

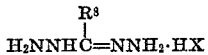

with a keto ester of the formula

in which

R⁸ is defined as —SR wherein R is an alkyl group;
R⁷ is an alkyl group;
R¹ is an alkyl, alkylthio, phenyl naphthyl, furyl, pyridyl or thienyl radical; and
X is an acid anion;

to obtain a cyclized compound of the formula

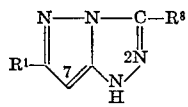

2. The process of claim 1 wherein reactive amounts of the isothiocarbohydrazide and keto ester are contacted at a temperature of about 75°–130° C.

3. A process for producing cyanine dyes comprising contacting a reactive amount of an isothiocarbohydrazide of the formula

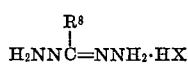

with a keto ester of the formula

to obtain the cyclized intermediate of the formula

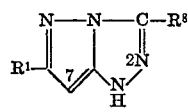

in which

R⁸ is defined as —SR wherein R is an alkyl group;
R⁷ is an alkyl group;
R¹ is an alkyl, alkylthio, phenyl, naphthyl, furyl, pyridyl or thienyl radicals; and
X is an acid anion;

and contacting said cyclized intermediate with a reactant selected from the group consisting of an alkyl ester of a lower aliphatic acid, a polyalkoxy lower alkane, and

wherein R¹¹ is defined as an alkoxy, alkoxythio, HCO—, alkoxy lower alkyl, acylanilidovinyl, alkoxyalkylidene, or acylanilidobutadienyl group, and

is a triazole, indolenine, benzthiazole, pyrrole, benzoxozole, benzoselenazole, benzimidozole, quinoline or isoquinoline group characteristic of cyanine and related dyes.

4. The process of claim 1 wherein R¹ is an alkyl and —R⁸ is an alkylthio radical.

5. The process of claim 1 wherein R¹ is an alkylthio and —R⁸ is an alkylthio radical.

6. The process of claim 1 wherein R¹ is a tertiary alkyl and —R⁸ is a lower alkylthio radical.

7. The process of claim 1 wherein X is an iodide anion.

8. The process of claim 1 wherein the molar ratio of isothiocarbohydrazide-to-keto ester is about 1:1.

9. The process of claim 3 wherein the reaction of the cyclized intermediate is effected in the presence of an inert organic reaction solvent.

10. The process of claim 9 wherein the reaction is effected with a lower alkanol or lower alkanoic acid as a reaction solvent.

11. A process for producing a pyrazolo[3,2-c]-s-triazole comprising contacting
 (1) S-methyl isothiocarbohydrazide hydroiodide with a reactive amount of
 (2) ethyl benzoylacetate, ethyl m-nitrobenzoyl acetate, ethyl stearoylacetate, ethyl p-nitrobenzoylacetate, ethyl butyrylacetate, ethyl-2-furoylacetate, or O-ethyl-S-methyl asymmetric diethiomalonate; affecting the reaction at a temperature of about 75°–130° C. and molar ratio of about 1:1, and recovering the resulting cyclized product.

References Cited

Beyer et al., Chem. Ber. vol. 89, pp. 2550–2555 (1956).
Reimlinger et al., Chem. Ber. vol. 103, pp. 3284–3288 (1970).

JOHN D. RANDOLPH, Primary Examiner

U.S. Cl. X.R.

96—130, 136; 260—240.4, 240.5, 240.65, 240.7, 240.9, 294.8 C, 306.8 F, 308 R